United States Patent
Pushak et al.

(10) Patent No.: US 12,299,553 B2
(45) Date of Patent: May 13, 2025

(54) EXPERT-OPTIMAL CORRELATION: CONTAMINATION FACTOR IDENTIFICATION FOR UNSUPERVISED ANOMALY DETECTION

(71) Applicant: Oracle International Corporation, Redwood Shores, CA (US)

(72) Inventors: Yasha Pushak, Vancouver (CA); Constantin Le Clei, Zurich (CH); Fatjon Zogaj, Zurich (CH); Hesam Fathi Moghadam, Sunnyvale, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 357 days.

(21) Appl. No.: 18/075,824

(22) Filed: Dec. 6, 2022

(65) Prior Publication Data
US 2024/0095231 A1 Mar. 21, 2024

Related U.S. Application Data (60) Provisional application No. 63/408,602, filed on Sep. 21, 2022.

(51) Int. Cl.
| | |
|---|---|
| *G06N 20/20* | (2019.01) |
| *G06F 16/23* | (2019.01) |
| *G06N 20/00* | (2019.01) |

(52) U.S. Cl.
CPC ......... *G06N 20/20* (2019.01); *G06F 16/2365* (2019.01); *G06N 20/00* (2019.01)

(58) Field of Classification Search
None
See application file for complete search history.

(56) References Cited

U.S. PATENT DOCUMENTS

2021/0209486 A1* 7/2021 Fan ................ G06N 20/20
2021/0264025 A1* 8/2021 Givental ............ G06F 18/285
(Continued)

OTHER PUBLICATIONS

Neuberg, Richard, et al., "Detective Relative Anomaly", 2015 18th Intl Conf, on Mach Learning and Data Mining in Pattern Recognition, Lecture Notes in Computer Science, LNAI 10358. Springer, doi.org/10.1007/978-3-319-62416-7_9, Jul. 2, 2017, 15pgs.
(Continued)

*Primary Examiner* — Irene Baker
(74) *Attorney, Agent, or Firm* — Hickman Becker Bingham Ledesma LLP; Brian Miller

(57) ABSTRACT

In a computer, each of multiple anomaly detectors infers an anomaly score for each of many tuples. For each tuple, a synthetic label is generated that indicates for each anomaly detector: the anomaly detector, the anomaly score inferred by the anomaly detector for the tuple and, for each of multiple contamination factors, the contamination factor and, based on the contamination factor, a binary class of the anomaly score. For each particular anomaly detector excluding a best anomaly detector, a similarity score is measured for each contamination factor. The similarity score indicates how similar, between the particular anomaly detector and the best anomaly detector, are the binary classes of labels with that contamination factor. For each contamination factor, a combined similarity score is calculated based on the similarity scores for the contamination factor. Based on a contamination factor that has the highest combined similarity score, the computer detects that an additional anomaly detector is inaccurate.

20 Claims, 4 Drawing Sheets

(56) References Cited

U.S. PATENT DOCUMENTS

| | | | |
|---|---|---|---|
| 2021/0326652 A1* | 10/2021 | Hazard | G06N 5/045 |
| 2021/0357699 A1* | 11/2021 | Saillet | G06F 18/217 |
| 2022/0138504 A1 | 5/2022 | Moghadam et al. | |
| 2022/0222546 A1* | 7/2022 | Mukherjee | G06N 20/20 |
| 2023/0376026 A1* | 11/2023 | Zhang | G06N 3/0442 |
| 2023/0419402 A1* | 12/2023 | Ghelichi | G06N 5/01 |

OTHER PUBLICATIONS

Gao, Jing, et al., "Converting Output Scores from Outlier Detection Algorithms into Probability Estimates", 6th Intl Conf on Data Mining (ICDM'06), pp. 212-221, doi:10.1109/ICDM.2006.43, Dec. 18, 2006, 10pgs.

Zhou, Junlin, et al., "Unsupervised Learning Based Distributed Detection of Global Anomalies", 2010, International Journal of Information Technology and Decision Making, vol. 2010, Nov. 2010, pp. 1-11.

Reunanen, Niko, et al., "Automatic optimization of outlier detection ensembles using a limited number of outlier examples", International Journal of Data Science and Analytics, vol. 10, pp. 377-394, Jun. 8, 2020, 18pgs.

Chalapathy et al., "Deep Learning for Anomaly Detection: A Survey", https://arxiv.org/pdf/1901.03407.pdf%20http://arxiv.org/abs/1901.03407.pdf, dated Jan. 24, 2019, 50 pages.

Goix, Nicolas, "How to Evaluate the Quality of Unsupervised Anomaly Detection Algorithms?", Presented at ICML2016 Anomaly Detection Workshop, New York, NY, USA, 2016, 13 pages.

Eskin, Eleazar, "Anomaly Detection Over Noisy Data Using Learned Probability Distributions", https://academiccommons.columbia.edu/doi/10.7916/D8C53SKF, dated 2000, 8 pages.

Dykes, Sandra, "Poster: An Extreme Value Theory Approach to Anomaly Detection (EVT-AD)", https://www.ieee-security.org/TC/SP2012/posters/An%20Extreme%20Value%20Theory%20Approach.pdf, dated 2012, 2 pages.

Davis et al., "LSTM-Based Anomaly Detection: Detection Rules from Extreme Value Theory", EPIA Conference on Artificial Intelligenc https://arxiv.org/pdf/1909.06041.pdf, dated Sep. 13, 2019, 12 pages.

Clemencon et al., "Scoring Anomalies: A M-estimation Formulation", Proceedings of the 16th International Conference on Artifical Intelligence and Statistics (AISTATS) 2013, vol. 31 of JMLR, 9 pgs.

Agarwal, Deepak, "An Empirical Bayes Approach to Detect Anomalies in Dynamic Multidimensional Arrays", Fifth IEEE International Conference on Data Mining (ICDM'05), dated 2005, 9 pages.

Chandola et al., "Anomaly Detection : A Survey", ACM Computing Surveys, dated Sep. 2009, 75 pages.

Li et al., "AutoOD: Neural Architecture Search for Outlier Detection", IEEE 37th International Conference on Data Engineering, DOI: 10.1109/ICDE51399.2021.00210, dated Apr. 2021, 6 pages.

Butakov, Nikita, "How to Build Robust Anomaly Detectors with Machine Learning", Ericsson, https://www.ericsson.com/en/blog/2020/4/anomaly-detection-with-machine-learning, dated Apr. 2020, 11 pages.

Breunig et al., "LOF: Identifying Density-Based Local Outliers", Proceedings of the 2000 ACM SIGMOD International Conference on Management of Data, https://dl.acm.org/doi/pdf/10.1145/342009.335388, dated 2000, 12 pages.

Azure, "Anomaly Detector", Microsoft, https://azure.microsoft.com/en-us/services/cognitive-services/anomaly-detector/, retrieved Dec. 6, 2022, 13 pages.

Anonymous authors, "Versatile Outlier Detection With Outlier Preserving Distribution Mapping Autoencoders", conference paper at ICLR 2020, dated 2019, 13 pages.

Angiulli et al., "Distance-Based Detection and Prediction of Outliers", IEEE Transactions on Knowledge and Data Engineering, vol. 18, No. 2, dated Feb. 2006, 16 pages.

An et al., "Variational Autoencoder Based Anomaly Detection Using Reconstruction Probability", SNU Data Mining Center, Special Lecture on IE 2.1 (2015), http://dm.snu.ac.kr/static/docs/TR/SNUDM-TR-2015-03.pdf, dated Dec. 27, 2015, 18 pages.

Christoffel et al., "Class-prior Estimation for Learning from Positive and Unlabeled Data", Asian Conference on Machine Learning, PMLR, vol. 45, dated Feb. 2016, 16 pages.

Rayana et al., "Sequential Ensemble Learning for Outlier Detection: A Bias-Variance Perspective", dated Sep. 18, 2016, 11 pages.

Yao et al., "Rethinking Class-Prior Estimation for Positive-Unlabeled Learning", in International Conference on Learning Representations, dated Sep. 28, 2021, 12 pages.

Yakovlev et al., "Oracle AutoML: A Fast and Predictive AutoML Pipeline", in Proceedings of the VLDB Endowment, vol. 13, No. 12, DOI: https://doi.org/10.14778/3415478.3415542, dated Aug. 2020, 15 pages.

Xing, Tony, "Introducing Multivariate Anomaly Detection", Microsoft, https://techcommunity.microsoft.com/t5/ai-cognitive-services-blog/introducing-multivariate-anomaly-detection/ba-p/2260679, dated Apr. 2021, 9 pages.

Xing, Tony, "Introducing Azure Anomaly Detector API", Microsoft, https://techcommunity.microsoft.com/t5/ai-customer-engineering-team/introducing-azure-anomaly-detector-api/ba-p/490162, dated Apr. 2019, 22 pages.

Wang et al., "Towards a Hierarchical Bayesian Model of Multi-View Anomaly Detection", Twenty-Ninth International Joint Conference on Artificial Intelligence, dated Jul. 11, 2020, 7 pages.

Swierczewski et al., "Use the Built-in Amazon SageMaker Random Cut Forest Algorithm for Anomaly Detection", https://aws.amazon.com/blogs/machine-learning/use-the-built-in-amazon-sagemaker-random-cut-forest-algorithm- for-anomaly-detection/, Apr. 2018.

Kriegel at al., "Interpreting and Unifying Outlier Scores", in Proceedings of the 2011 SIAM International Conference on Data Mining, dated 2011, 12 pages.

Sakurada et al., "Anomaly Detection Using Autoencoders with Nonlinear Dimensionality Reduction", MLSDA '14, Dec. 2, 2014, Gold Coast, QLD, Australia Copyright 2014 ACM, 8 pages.

Le Clei et al., "N-1 Experts: Unsupervised Anomaly Detection Model Selection", in First Conference on Automated Machine Learning (Late-Breaking Workshop), dated May 2022, 14 pages.

Perini et al., "Transferring the Contamination Factor between Anomaly Detection Domains by Shape Similarity", in Proceedings of the Thirty-Sixth AAAI Conference on Artificial Intelligence, vol. 36, No. 4, dated Jun. 2022, 9 pages.

Perini et al., "Class Prior Estimation in Active Positive and Unlabeled Learning", in Proceedings of the 29th IJCAI and the 17th PRICAI, dated Jul. 2020, 7 pages.

Palacio-Nino et al., "Evaluation Metrics for Unsupervised Learning Algorithms", Machine Learning, DOI: 10.48550/arXiv.1905.05667, dated May 23, 2019, 9 pages.

Nguyen et al., "An Evaluation Method for Unsupervised Anomaly Detection Algorithms", Journal of Computer Science and Cybernetics, V.32, N.3, dated 2016, 14 pages.

Lin et al., "What's New with BigQuery ML: Unsupervised Anomaly Detection for Time Series and Non-time Series Data", Google Cloud Blog, https://cloud.google.com/blog/products/data-analytics/bigquery-ml-unsupervised-anomaly-detection, dated Jul. 2021, 9 pgs.

Zhao et al., "Automatic Unsupervised Outlier Model Selection", in Advances in Neural Information Processing Systems, 34, dated 2021, 14 pages.

Schubert et al., "On Evaluation of Outlier Rankings and Outlier Scores", 12th SIAM International Conference on Data Mining, dated 2012, 12 pages.

Fol et al., "Detection of faulty beam position monitors using unsupervised learning", Physical Review Accelerators and Beams, vol. 23, pp. 102805-1-102805-10, Oct. 27, 2020.

\* cited by examiner

EXPERT-OPTIMAL CORRELATION: CONTAMINATION FACTOR IDENTIFICATION FOR UNSUPERVISED ANOMALY DETECTION

CROSS-REFERENCE TO RELATED APPLICATION; BENEFIT CLAIM

This application claims the benefit of Provisional Appln. 63/408,602, filed Sep. 21, 2022, the entire contents of which is hereby incorporated by reference as if fully set forth herein, under 35 U.S.C. § 119(e). Incorporated herein by reference in its entirety is related U.S. patent application Ser. No. 18/075,667 N–1 EXPERTS: MODEL SELECTION FOR UNSUPERVISED ANOMALY DETECTION filed Dec. 6, 2022 by Yasha Pushak et al.

FIELD OF THE INVENTION

The present invention relates to anomaly detector testing for machine learning (ML). Herein is contamination factor identification (CFI) automation for unsupervised validation of an anomaly detector with unlabeled test tuples.

BACKGROUND

Unsupervised anomaly detection (UAD) is the task of detecting anomalous or rare datapoints in a dataset without being given any ground-truth labeling of the data. This problem is substantially harder than classical supervised learning because there is no one-fits-all definition of an anomaly and any definition may differ from one dataset to another.

Given an unlabeled dataset, most existing methods for UAD output an anomaly score for each datapoint. If a datapoint is detected as anomalous, the predicted anomaly score is high. If the point is instead detected as normal (i.e. non-anomalous), the anomaly score is low. If the count A of anomalies in the dataset were hypothetically already known, a set of points could be predicted to be anomalies by ranking (i.e. sorting) the points in the dataset by anomaly score and selecting the A datapoints with the largest anomaly score. However the true percentage of anomalous datapoints in the dataset, also referred to as the contamination factor, is typically unknown. In fact, most methods require a user to supply the contamination factor, or otherwise fall back on an arbitrary default percentage (for example, 0.1, i.e. 10%) that are guaranteed to be incorrect for most datasets.

As a general rule, an anomaly detector should fail validation testing if the anomaly detector identifies a percentage of datapoints in a test corpus as anomalous that is significantly different from the actual contamination factor of the test corpus. However if the actual contamination factor is unknown, this general rule cannot be applied with the state of the art.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present invention relates to anomaly detector testing for machine learning (ML). Contamination factor identification (CFI) entails detecting the contamination factor in an unlabeled dataset. Consensus techniques herein leverage complementary information from a set of unsupervised anomaly detection (UAD) models. This approach dynamically discovers the contamination factor that maximizes the overall correlation of the anomaly scores predicted by the K best UAD models. This approach is the first to solve CFI without requiring access to any labeled data or historical information, and is general enough to be used with any kind of correlation such as F1 or mean squared error.

UAD is the problem of predicting a set of anomalies in an unlabeled dataset. Given a dataset made of n datapoints, anomaly detection methods typically consist of two stages:

1. Predict an anomaly score for each datapoint, i.e. how anomalous the method characterizes the given point is (a high anomaly score means that the method infers that the point is highly anomalous, while a low score means that the method infers the point is normal).
2. Assuming the contamination factor (CF), which is the percentage of anomalies in the dataset, is already known, predict the set of anomalies to be the n*CF datapoints with the largest anomaly scores.

In order to predict set of anomalies of above stage (2), anomaly detection models typically use a threshold (T), which may be the 1-CF quantile of the anomaly scores, i.e. the value such that the percentage of datapoints with anomaly score larger than T is CF. In other words, all datapoints with anomaly scores larger than T should be considered to be anomalies in above stage (2), and datapoints with anomaly scores smaller than T will be normal. Given a list of anomaly scores, T and CF are complementary quantities that sum to one or 100%, when given either of those quantities, the other can be derived.

However, in practice the actual CF is unknown. In fact, most anomaly detection methods assume CF to be fixed to some value (usually 0.1). That assumption may not be correct and, in critical real-applications scenarios, may lead to a high number of false positives (i.e. normal points being mislabeled as anomalies) or often worse, a high number of false negatives (i.e. anomalies being mislabeled as normal points).

Contamination Factor Identification (CFI) is the problem of determining the percentage of anomalies in a given dataset, without being given any ground-truth labels (and therefore any information about what an anomaly should look like). This problem has not been addressed neither in literature nor by industry leading independent software vendors (ISVs) and original equipment manufacturers (OEMs).

Earlier approaches make assumptions that are typically not verified for general real-life scenarios. In particular, the distribution of anomaly scores may be widely different from one dataset to another, and access is typically unavailable to examples of anomaly points as needed by techniques such as Positive-Unlabeled Learning, because an anomaly is unexpected by definition.

UAD herein has a similarity metric that is a function that accepts as input a set of predictions and the corresponding set of labels, and returns a score corresponding to some distance between the predictions and labels. That score may be any of: a validation score, an accuracy, an error total, or a similarity or dissimilarity measure. Any of those scores may be used as a similarity score that is scaled from a low of zero to a high of one or 100% that indicates perfect agreement between a set of test inferences and a corresponding set of test labels.

Similarity herein may be any one of the following mutually exclusive classes of metrics.
  Binary-binary metric requires the predictions of the model and the labels to be binary predictions (0 or 1). This includes F1-score or balanced accuracy.
  Continuous-binary metric requires only the labels to be binary predictions, while predictions can be probabilities (any real number between 0 and 1). This includes area under precision recall curve (AUPRC), area under receiver operating characteristic curve (AUROC), or precision at n (PAN).
  Continuous-continuous metric requires neither labels nor predictions to be binary. This includes mean squared error (typically used for regression) or normalized discounted cumulative gain (NDCG).

Distinctions between the above enumerated kinds of similarity metrics may be important when predictions of an anomaly detector are probabilities, which prevents accurate binary predictions if the contamination factor is unknown. Scores given by binary-binary metrics are often very low and not informative in UAD. Thus, a continuous-binary or continuous-continuous metric may instead be used to evaluate a model.

Given an unlabeled dataset, to identify the contamination factor, an embodiment first runs the N−1 Experts model selection stage of the Oracle AutoML, pipeline as presented in related U.S. patent application Ser. No. 18/075,667. This outputs a set of models sorted by predicted performance (i.e. fitness, accuracy) on the given dataset. From those, the best model B is selected according to N−1 Experts, and the set S of the K best remaining models (K is typically between 1 and 4). However, any method for picking these sets of high-quality models could be used.

The general idea of this approach is to iterate over contamination factors (typically between 0.01 and 0.5) and select the contamination factor that leads to the highest mean similarity between model B and each model in the set S.

For a given contamination factor and an arbitrary binary-binary similarity metric (e.g. F1-score 'binary' or F1-score 'macro'), also later herein discusses using a continuous-binary similarity metric), the similarity score between two models is computed by converting the anomaly scores predicted by each model to binary scores using the given contamination factor. The similarity score is then computed as the evaluation of the similarity metric on those two binary scores.

The following are justifications that the contamination factor with the highest mean similarity across models should be close to the ground-truth (i.e. actual) contamination factor.
  1. Models are obtained from the N−1 Experts model selection stage, and should therefore have accurate and correlated intrinsic definitions of anomalies.
  2. Models agree more on points with more extreme anomaly scores than milder ones (extreme referring to scores at either end of the distribution; mild referring to scores in the middle). This has been verified in practice. The similarity should therefore decrease as more points with milder anomaly scores are considered as anomalies for an increasing contamination factor.
  3. The F1-score provides implicit regularization, in the sense that it prevents small contamination factors from having a too large similarity score. This is because the F1-score is typically low for very unbalanced classes.
  4. Above points (2) and (3) imply that the F1-score should increase as the contamination factor is increased, until the models start disagreeing on what looks anomalous, which often corresponds to when points start looking more normal. Past that, the F1-score should start decreasing as the contamination factor is increased.

This approach includes at least the following advantages.
Does not require access to ground truth labels.
Does not require access to historical information from other anomaly detection datasets, including knowledge of the ground-truth labels/contamination factor for those datasets. From this point of view, it is not affected by possible data mislabeling of past datasets.
Runs in polynomial time with respect to the number of records in the train dataset and in linear time with respect to the number, K, of selected best models.

This approach includes at least the following innovations.
The first and only method for estimating the contamination factor of a dataset that does not require any labels or any similar historical datasets.
The first to predict the contamination factor based on the correlation of the anomaly scores predicted by anomaly detection models.
General enough to be applied with any kind of similarity metric, including both binary-binary and continuous-binary metrics such as AUROC.

In an embodiment in a computer, each of multiple anomaly detectors infers a respective anomaly score respectively for each of many tuples in a test corpus. For each tuple, a respective synthetic label is generated that indicates for each anomaly detector: the anomaly detector, the anomaly score inferred by the anomaly detector for the tuple and, for each of multiple contamination factors, the contamination factor and, based on the contamination factor, a binary class of the anomaly score. A best anomaly detector that has a highest fitness is selected. For each particular anomaly detector excluding the best anomaly detector, a respective similarity score is respectively measured for each contamination factor. The similarity score indicates how similar, between the particular anomaly detector and the best anomaly detector, are the binary classes of respective labels with that contamination factor. For each contamination factor, a respective combined similarity score is calculated based on the similarity scores for the contamination factor. Based on a contamination factor that has the highest combined similarity score, the computer detects that an additional anomaly detector, which is not one of the multiple anomaly detectors, is inaccurate.

1.0 Example Computer

Figure 1:
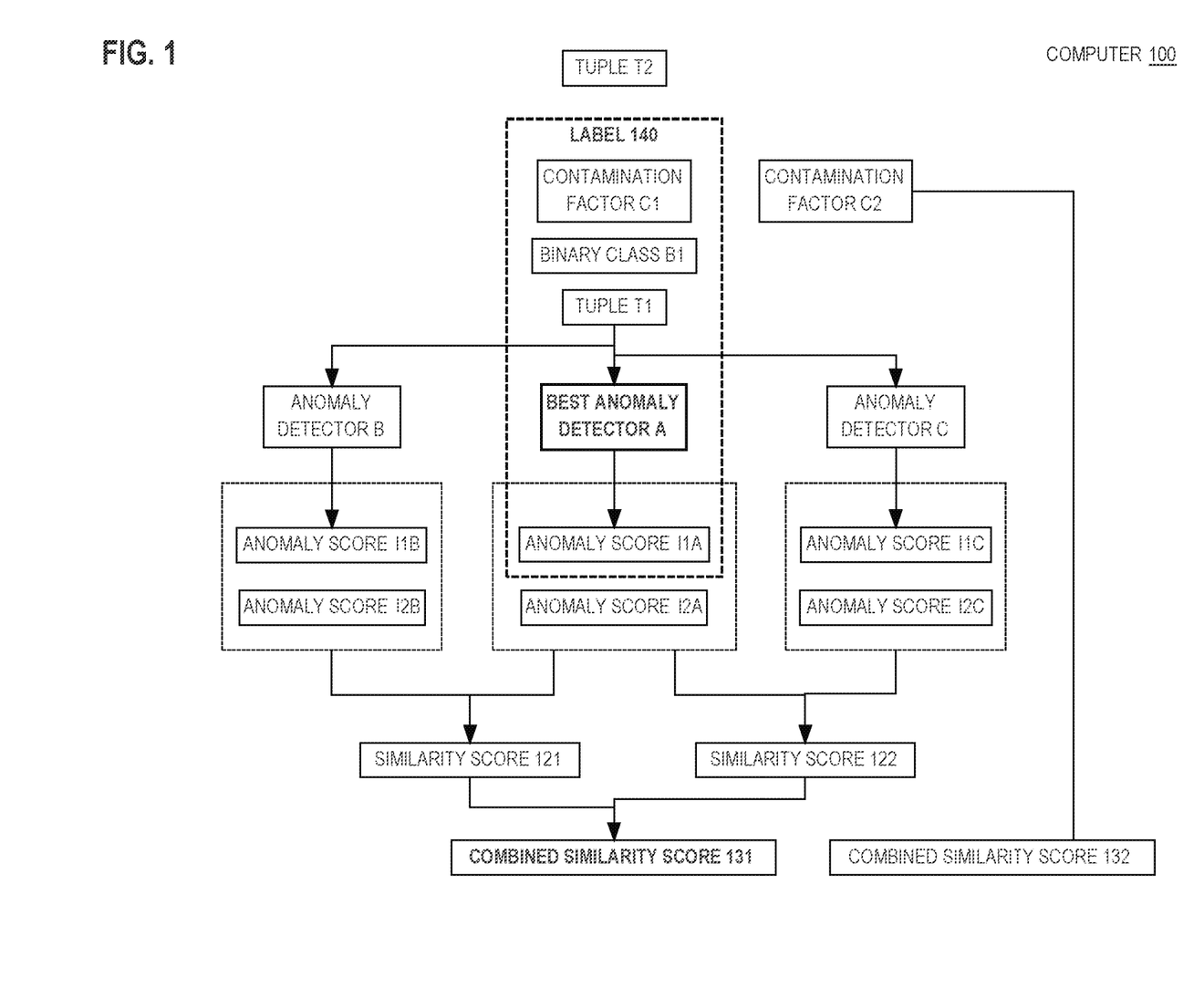
FIG. 1 is a block diagram that depicts an example computer that provides anomaly detector testing based on contamination factor identification (CFI) automation for unsupervised validation of an anomaly detector with unlabeled test tuples.

FIG. 1 is a block diagram that depicts an example computer 100. In an embodiment, computer 100 provides anomaly detector testing based on contamination factor identification (CFI) automation for unsupervised validation of an anomaly detector with unlabeled test tuples T1-T2. Computer 100 may be one or more of a rack server such as a blade, a personal computer, a mainframe, or a virtual computer.

1.1 Anomaly Detection

This example lacks training, and each of anomaly detectors A-C is not a machine learning (ML) model or is one that is already trained. Another example may entail also training some or all of anomaly detectors A-C based on a training corpus that does or does not contain tuples T1-T2. A respective feature vector that anomaly detectors A-C accept as input is one of tuples T1-T2 or is populated with encoded feature values from tuples T1-T2. In one example, anomaly detectors B-C have different respective values for a same set of hyperparameters of an ML algorithm. In other words, anomaly detectors B-C may be differently configured model instances of a same ML algorithm.

In batches or individually in a stream, each of anomaly detectors A-C accepts tuples T1-T2 as separate inputs that cause anomaly detectors A-C to generate respective inferences I1A-I2A, I1B-I2B, and I1C-I2C. For example, anomaly detector C infers inferences I1C-I2C from respective tuples T1-T2. Depending on the embodiment, an inference may be an anomaly score such as a unit normalized probability or a binary class such as anomaly or non-anomaly. A numeric threshold may be used to convert a numeric anomaly score to a binary class.

1.2 Unsupervised Testing

This example entails an unsupervised testing phase of the software development lifecycle (SDLC) of a target anomaly detector (not shown) that, depending on the embodiment, is or is not one of anomaly detectors A-C. Unsupervised testing means that validation of the target anomaly detector occurs even if test tuples T1-T2 are unlabeled. In an embodiment, some or all of anomaly detectors A-C and the target anomaly detector were unsupervised trained with an unlabeled training corpus. In an embodiment, anomaly detectors A-C and the target anomaly detector were trained with same or different training corpuses. A label is a binary class or anomaly score of a tuple that is known as correct.

Because test tuples T1-T2 are unlabeled, direct measurement of the accuracy of the target anomaly detector may be more or less impossible. Herein, accuracy is instead indirectly measured by comparison of inferred contamination factors. Best estimation of an unknown contamination factor occurs by comparison of inferences by best anomaly detector A to inferences by other anomaly detectors B-C.

1.3 Multiple Anomaly Detectors

Anomaly detectors A-C are best of breed anomaly detectors of unrelated pedigree to increase diversity of analytics. For example, each of anomaly detectors A-C may have a distinct architecture (e.g. neural network or decision tree) and/or be provided in a distinct software library (e.g. scikit-learn or TensorFlow).

In an embodiment, anomaly detectors A-C are so different that they have no hyperparameters in common, which means their respective sets of hyperparameters are disjoint (i.e. do not overlap). For example, a neural network may have a neurons per layer hyperparameter that a random forest would not have. In an embodiment and unlike the target anomaly detector, anomaly detectors A-C are not operated for actual detection of anomalies arising in a production environment.

1.4 Similarity to Best Anomaly Detector

Best anomaly detector A is selected for being the most accurate of anomaly detectors A-C, which does not mean that best anomaly detector A is more or less accurate than the target anomaly detector. Each of similarity scores 121-122 is a measure of how similar are best anomaly detector A's inferences to respective inferences of anomaly detector B or C.

For example, a maximum for similarity score 121 occurs when inferences I1A and DB are identical and inferences I2A and I2B are identical anomaly scores or binary classes. A minimum for similarity score 121 instead occurs when inferences DA and DB are opposite binary classes (or very dissimilar anomaly scores) and inferences I2A and I2B also are opposite binary classes. Similarity score 121 increases when inferences for a same tuple are similar and decreases when inferences for a same tuple are dissimilar.

1.5 Contamination Factor Identification (CFI)

Herein, CFI entails comparing sets of inferences by anomaly detectors B-C to best anomaly detector A for a same set of test tuples T1-T2 to measure similarity scores 121-122. Similarity scores are remeasured at a variety of presumed (e.g. predefined) contamination factors that are potential contamination factors and not necessarily the (e.g. unknown) actual contamination factor of the test corpus (i.e. tuples T1-T2). The binary class (e.g. anomaly or non-anomaly) of an anomaly score depends on the presumed contamination factor. For example, a presumed contamination factor of ten percent means that only the tenth of the test corpus's tuples with the highest anomaly scores should be classified as anomalies. For example, anomaly score DA may be classified as non-anomalous at lower contamination factor C1 and instead classified as anomalous at higher contamination factor C2.

1.6 Binary Class of Generated Label Depends on Presumed Contamination Factor In preparation for generating similarity scores 121-122, computer 100 automatically generates a respective so-called label for each inference by anomaly detectors A-C for each of tuples T1-T2. Labels generated herein are also referred to as synthetic labels, which are not ground-truth labels as explained below.

Because the binary class of an anomaly score depends on the presumed contamination factor, an embodiment may or may not generate separate labels for each of contamination factors C1-C2. In this example, label 140 is generated for anomaly score I1A at contamination factor C1, but there may be another label (not shown) for same anomaly score I1A at contamination factor C2 instead.

1.7 Generated Label Granularity and Structure

Label 140 is logical and its shown data fields may or may not be consolidated into a single data structure. In particular, label 140 references (e.g. identifies or contains) contamination factor C1, anomaly score I1A, binary class B1 for anomaly score I1A at contamination factor C1, tuple T1, and best anomaly detector A that inferred inference I1A for tuple T1. In an embodiment, generating similarity scores 121-122 entails comparing respective binary classes of labels, such as binary class B1 in label 140.

Each generated label references exactly one tuple and exactly one of anomaly detectors A-C. In the shown embodiment, each generated label references exactly one of each of: a contamination factor, a binary class, and an anomaly score. In various embodiments of other labeling granularities not shown, a generated label may reference one or more contamination factors, one or more anomaly scores, and one or more binary classes.

1.8 Kinds of Labels and Lack of Supervision

The veracity of binary class B1 in generated label 140 is unknown. However, label 140 is not a weak label, which is a label of unknown veracity that still is used due to a likelihood of being correct. Unlike a weak label, techniques herein do not presume nor assess the veracity of binary class B1 in label 140. Unlike weak labels, labels generated herein are used for testing, not for training.

Herein, unlabeled (or unsupervised) means that a test tuple or test corpus lacks ground truth label(s) that are known as correct. Binary class B1 in generated label 140 is not known to be correct. Thus, a generated label is not actually a label per the state of the art that has only ground truth labels. For example per the state of the art, tuple T1 is unlabeled because tuple T1 has no ground truth label even though tuple T1 has multiple generated labels including generated label 140.

For each of contamination factors C1-C2, similarity scores are generated and combined. For example for contamination factor C1, similarity scores 121-122 are measured and combined to calculate combined similarity score 131. Each of contamination factors C1-C2 has its own combined similarity score. For example, contamination factor C2 has combined similarity score 132.

CFI entails selecting which of contamination factors C1-C2 has the highest combined similarity score, which is the contamination factor at which the binary classes in anomaly detectors A-C's generated labels have the most consistent agreement. Example uses of an automatically identified best contamination factor are discussed later herein.

2.0 Example Unsupervised Testing Process

Figure 2:
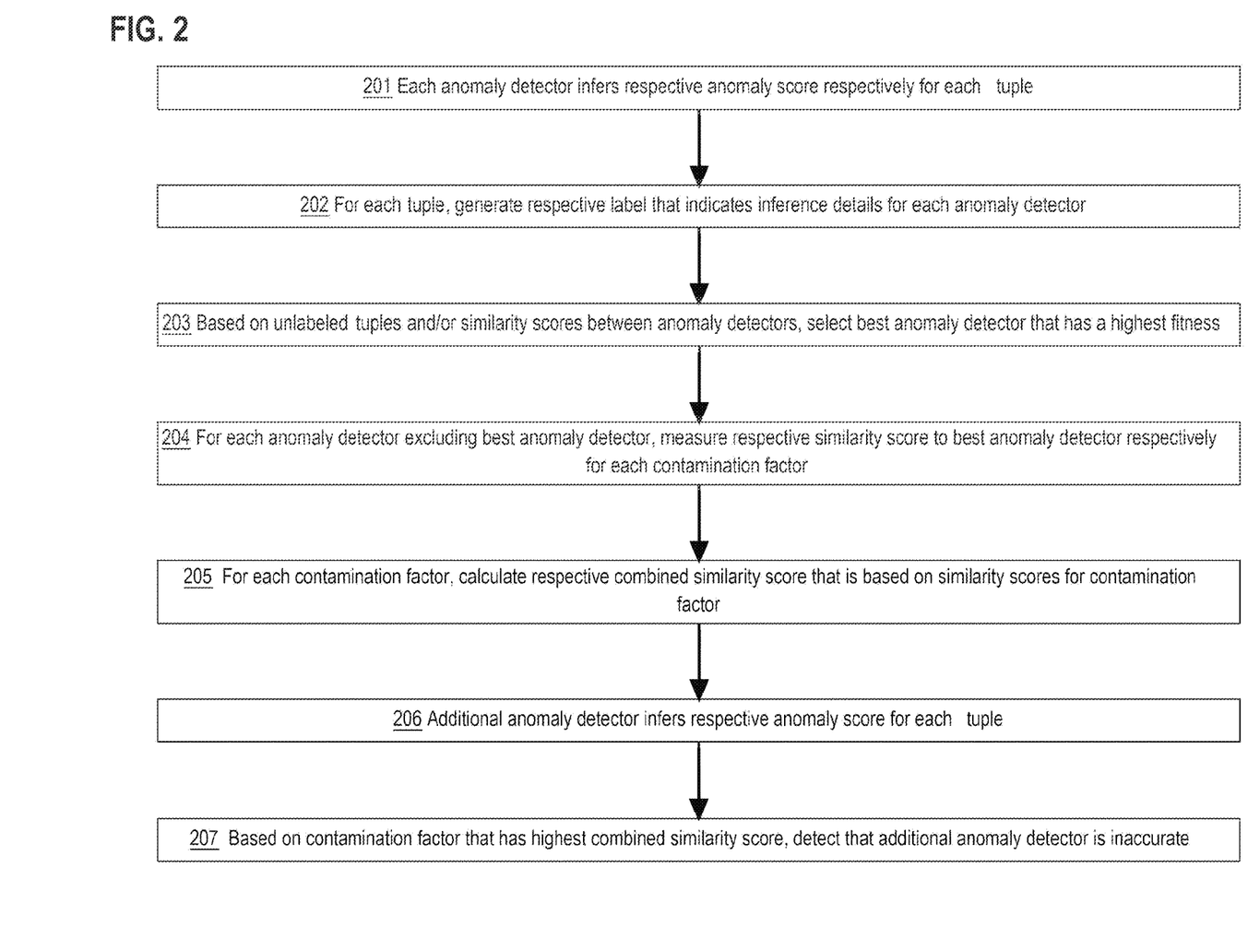
FIG. 2 is a flow diagram that depicts example process that a computer may use for anomaly detector testing based on CFI automation for unsupervised validation of an anomaly detector with unlabeled test tuples.

FIG. 2 is a flow diagram that depicts an example process that computer 100 may use to perform anomaly detector testing based on contamination factor identification (CFI) automation for unsupervised validation of an anomaly detector with unlabeled test tuples T1-T2. FIG. 2 is discussed with reference to FIG. 1.

All of steps 201-207 may occur without ground-truth labels, and a test corpus (i.e. tuples T1-T2) may be unlabeled. In step 201, each of anomaly detectors A-C infers a respective anomaly score respectively for each of tuples T1-T2. Step 201 does not entail a presumed nor actual contamination factor. The anomaly scores are retained for processing as discussed below.

For each of tuples T1-T2 at each of contamination factors C1-C2, step 202 generates a respective label that indicates inference details for each of anomaly detectors A-C. For example, step 202 generates label 140 as discussed earlier herein.

Based on unlabeled tuples and/or similarity scores between anomaly detectors, step 203 selects best anomaly detector A that has a highest fitness of anomaly detectors A-C. In an embodiment, selection of best anomaly detector A is based on unsupervised testing with unlabeled tuples in a test corpus as presented in related U.S. patent application Ser. No. 18/075,667. Depending on the embodiment, selection step 203 does or does not occur before labeling step 202 and/or inferencing step 201.

In an embodiment, best anomaly detector A is not an artificial neural network (ANN). In an embodiment, best anomaly detector A does not have a contamination factor hyperparameter.

For each of anomaly detectors B-C excluding best anomaly detector A, step 204 measures a respective similarity score between the anomaly detector and best anomaly detector A respectively for each of contamination factors C1-C2. For example, binary classes in labels for contamination factor C1 for anomaly detector B may be compared to binary classes in labels such as label 140 for contamination factor C1 for best anomaly detector A when step 204 measures similarity score 121.

For each of contamination factors C1-C2, step 205 calculates a respective combined similarity score that is based on similarity scores for that contamination factor. For example for contamination factor C1, step 205 calculates combined similarity score 131 based on applying an aggregation operation to similarity scores 121-122 such as any of: an average, a median, a maximum, and a sum. The best (i.e. most accurate) estimated contamination factor is the one with the highest combined similarity score. Thus, step 205 may perform CFI.

In an embodiment, anomaly detectors A-C do not include an additional anomaly detector that is used for production anomaly detection. Herein, the target anomaly detector and the additional anomaly detector are synonyms. In step 206, the additional anomaly detector infers a respective anomaly score for each of tuples T1-T2. For example, steps 201 and 206 differ more or less only on which anomaly detector is used.

Based on the contamination factor that has the highest combined similarity score, step 207 detects that the additional anomaly detector is inaccurate. For example per earlier step 205, best contamination factor C1 may be ten percent. In other words, the additional anomaly detector should generate anomaly scores in previous step 206 that, based on the additional anomaly detector's own production anomaly threshold, should cause exactly ten percent of the test corpus (i.e. tuples T1-T2) to be classified as anomalies.

In an embodiment, a tolerance threshold defines how much divergence between best contamination factor C1 and the effective contamination factor of the additional anomaly detector. For example, the tolerance threshold may be one percent, in which case the additional anomaly detector is accurate (i.e. passes this validation test) if its effective contamination factor is between nine and eleven percent. Herein, an effective contamination factor is empirically observed by a given anomaly detector.

For example if five or fifteen percent of tuples T1-T2 receive an anomaly score from the additional anomaly detector that exceeds the additional anomaly detector's production threshold, then the effective contamination factor is five or fifteen percent, which is outside a one percent tolerance around ten percent. In that case, the additional anomaly detector fails its validation test. An effective contamination factor is not necessarily the actual contamination factor, which may be unknown.

Thus, the additional anomaly detector is validation tested: a) without comparing an individual or average anomaly score by the additional anomaly detector to an individual or average anomaly score by another anomaly detector, b) without ground-truth labels for the test corpus, and c) without ever knowing the actual contamination factor of the test corpus.

In an embodiment, the process of FIG. 2 does not involve meta-learning, a metamodel, meta-features, supervised training, nor cross validation. In an embodiment, the process of FIG. 2 occurs in linear time with respect to a count of anomaly detectors and occurs in polynomial time with respect to a count of tuples. In an embodiment, the process of FIG. 2 occurs in an ML pipeline.

4.0 Exemplary CFI Embodiment

The following exemplary contamination factor identification (CFI) embodiment may incorporate aspects of embodiments presented earlier herein. Design choices in this exemplary CFI embodiment are demonstrative and do not limit the earlier embodiments.

Similarity herein may be any one of the following mutually exclusive classes of metrics.

Binary-binary metric requires the predictions of the model and the labels to be binary predictions (0 or 1). This includes F1-score or balanced accuracy.

Continuous-binary metric requires only the labels to be binary predictions, while predictions can be probabilities (any real number between 0 and 1). This includes area under precision recall curve (AUPRC), area under receiver operating characteristic curve (AUROC), or precision at n (PAN).

Continuous-continuous metric requires neither labels nor predictions to be binary. This includes mean squared error (typically used for regression) or normalized discounted cumulative gain (NDCG).

The above enumerated classes of metrics are alternative configurations for this exemplary CFI embodiment. For demonstration, this example uses a binary-binary metric to measure similarity. Depending on the embodiment, similarity measurement may instead use any of: balanced accuracy measurement, area under precision recall curve (AUPRC), area under receiver operating characteristic curve (AUROC), precision at n (PAN), mean squared error, normalized discounted cumulative gain (NDCG), mutual information, cross entropy, logistic loss, log loss, and Kullback-Leibler (KL) divergence.

This exemplary CFI process expects the following inputs.

A training set of size N.

The model B (e.g. best anomaly detector A) with the highest predicted performance, as given by the N−1 Experts model selection stage presented in related U.S. patent application Ser. No. 18/075,667.

The set S (e.g. anomaly detectors B-C) of the K-highest predicted performance models excluding B, as given after running the N−1 Experts model selection stage. E.g. K=1.

A binary-binary metric, such as the F1-score. E.g. F1-score with 'binary' average.

A set of contamination factors C to be considered during the procedure, such as 50 distinct values evenly spaced in the interval [0.0 1, 0.5].

The CFI process implements the following pseudocode algorithm.

1. For each model m in the union of S and {B} and each contamination factor c in C, construct a set of artificial labels L(m,c) for the training set by labeling the N*c training points with the highest anomaly score (as given by model m) as anomalies, and label the remaining points as normal.
2. For each contamination factor c in C:
    a. For each model m in S, compute the similarity score as given by the similarity metric applied to the binary predictions L(B,c) and the binary labels L(m, c).
    b. Average all K similarity scores (by taking the mean, median, etc.) to produce the average similarity score for contamination factor c.
3. Select the contamination factor with the largest average similarity score.

A continuous-binary metric may instead be used, such as AUROC, AUPRC or PAN as discussed above. In that case, only anomaly scores of either model B or model m need conversion to binary scores. In practice there is poorer performance when using such metrics, which might be due to removing the implicit regularization contained in the F1-score.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
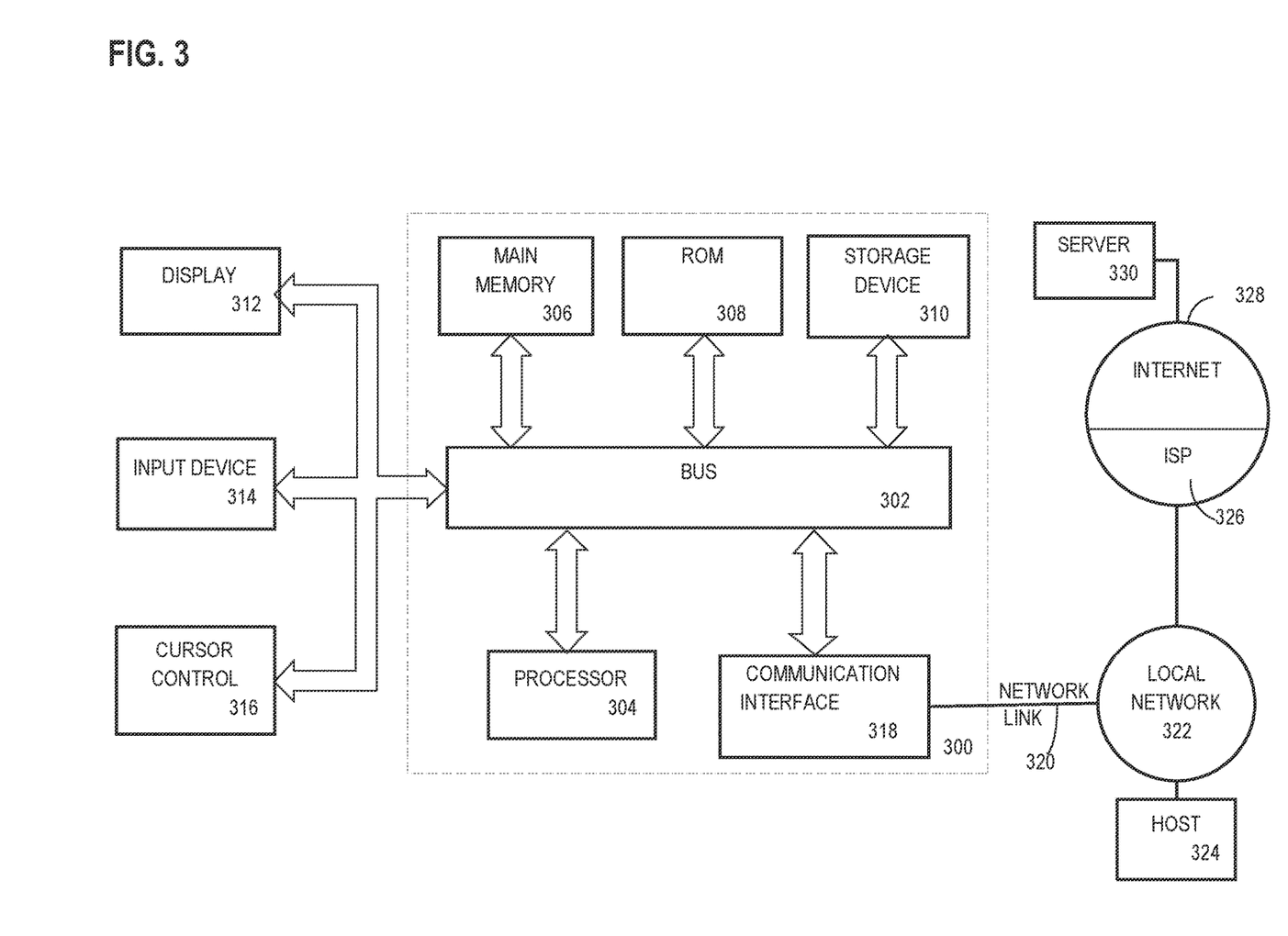
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

Figure 4:
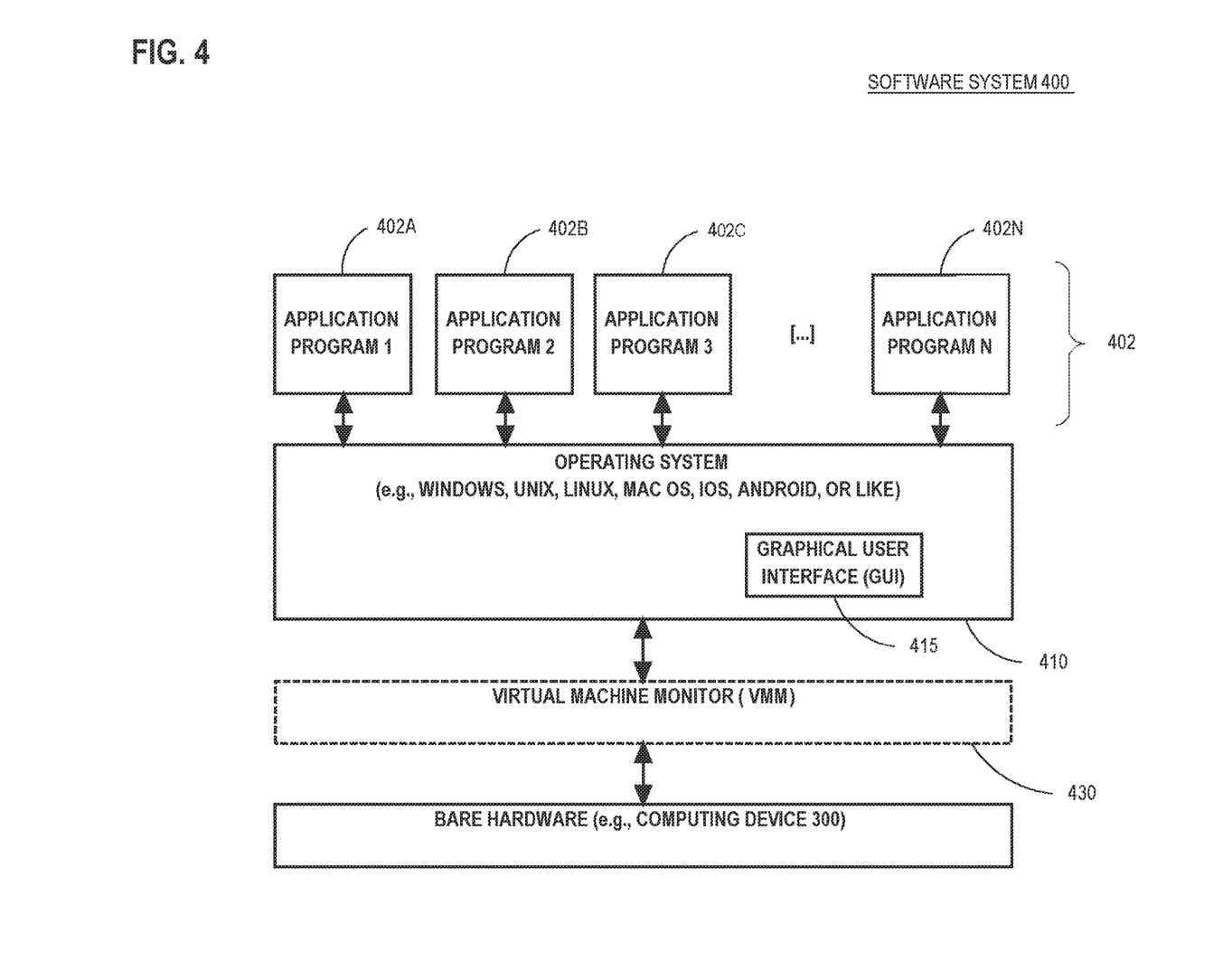
FIG. 4 is a block diagram that illustrates a basic software system that may be employed for controlling the operation of a computing system.

FIG. 4 is a block diagram of a basic software system 400 that may be employed for controlling the operation of computing system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   inferring, by each anomaly detector of a plurality of anomaly detectors, a respective anomaly score respectively for each tuple in a plurality of tuples;
   generating, for each tuple in the plurality of tuples, a respective label that indicates for each anomaly detector of the plurality of anomaly detectors: the anomaly detector, the anomaly score inferred by the anomaly detector for the tuple and, for each contamination factor of a plurality of contamination factors, the contamination factor and a binary class of the anomaly score based on the contamination factor;
   selecting a best anomaly detector of the plurality of anomaly detectors that has a highest fitness;
   measuring, for each particular anomaly detector of the plurality of anomaly detectors excluding the best anomaly detector, a respective similarity score respectively for each contamination factor of the plurality of contamination factors, wherein the similarity score indicates how similar, between the particular anomaly detector and the best anomaly detector, are said binary classes of respective labels with said contamination factor;
   calculating, for each contamination factor of the plurality of contamination factors, a respective combined similarity score that is based on said similarity scores for the contamination factor; and
   detecting, based on a contamination factor that has the highest combined similarity score of the plurality of contamination factors, that an additional anomaly detector that is not in the plurality of anomaly detectors is inaccurate.

2. The method of claim 1 wherein said selecting the best anomaly detector is based on at least one selected from the group consisting of unlabeled tuples and a similarity score between the best anomaly detector and another anomaly detector of the plurality of anomaly detectors.

3. The method of claim 1 wherein said selecting the best anomaly detector occurs before at least one step selected from the group consisting of said inferring the anomaly scores and said generating the labels.

4. The method of claim 1 wherein said detecting that the additional anomaly detector is inaccurate comprises the additional anomaly detector inferring a respective anomaly score for each tuple in the plurality of tuples.

5. The method of claim 1 wherein an actual contamination factor of the plurality of tuples is unknown.

6. The method of claim 1 wherein said measuring said similarity scores comprises applying at least one selected from the group consisting of: F1 scoring, balanced accuracy measurement, area under precision recall curve (AUPRC), area under receiver operating characteristic curve (AUROC), precision at n (PAN), mean squared error, normalized discounted cumulative gain (NDCG), mutual information, cross entropy, logistic loss, log loss, and Kullback-Leibler (KL) divergence.

7. The method of claim 1 wherein each anomaly detector of the plurality of anomaly detectors has a disjoint set of hyperparameters.

8. The method of claim 1 constrained by at least one selected from the group consisting of:
   a) the method does not use at least one selected from the group consisting of meta-learning, a metamodel, meta-features, supervised training, and cross validation,
   b) the method occurs in polynomial time with respect to a count of at least one selected from the group consisting of the plurality of anomaly detectors and the plurality of tuples, and
   c) the method occurs entirely within a machine learning (ML) pipeline.

9. The method of claim 1 wherein said calculating said combined similarity scores comprises calculating at least one selected from the group consisting of an average, a median, a maximum, and a sum.

10. The method of claim 1 wherein the best anomaly detector does not comprise at least one selected from the group consisting of an artificial neural network (ANN) and a contamination factor hyperparameter.

11. One or more computer-readable non-transitory media storing instructions that, when executed by one or more processors, cause:
    inferring, by each anomaly detector of a plurality of anomaly detectors, a respective anomaly score respectively for each tuple in a plurality of tuples;
    generating, for each tuple in the plurality of tuples, a respective label that indicates for each anomaly detector of the plurality of anomaly detectors: the anomaly detector, the anomaly score inferred by the anomaly detector for the tuple and, for each contamination factor of a plurality of contamination factors, the contamination factor and a binary class of the anomaly score based on the contamination factor;
    selecting a best anomaly detector of the plurality of anomaly detectors that has a highest fitness;
    measuring, for each particular anomaly detector of the plurality of anomaly detectors excluding the best anomaly detector, a respective similarity score respectively for each contamination factor of the plurality of contamination factors, wherein the similarity score indicates how similar, between the particular anomaly detector and the best anomaly detector, are said binary classes of respective labels with said contamination factor;

calculating, for each contamination factor of the plurality of contamination factors, a respective combined similarity score that is based on said similarity scores for the contamination factor; and detecting, based on a contamination factor that has the highest combined similarity score of the plurality of contamination factors, that an additional anomaly detector that is not in the plurality of anomaly detectors is inaccurate.

12. The one or more computer-readable non-transitory media of claim 11 wherein said selecting the best anomaly detector is based on at least one selected from the group consisting of unlabeled tuples and a similarity score between the best anomaly detector and another anomaly detector of the plurality of anomaly detectors.

13. The one or more computer-readable non-transitory media of claim 11 wherein said selecting the best anomaly detector occurs before at least one step selected from the group consisting of said inferring the anomaly scores and said generating the labels.

14. The one or more computer-readable non-transitory media of claim 11 wherein said detecting that the additional anomaly detector is inaccurate comprises the additional anomaly detector inferring a respective anomaly score for each tuple in the plurality of tuples.

15. The one or more computer-readable non-transitory media of claim 11 wherein an actual contamination factor of the plurality of tuples is unknown.

16. The one or more computer-readable non-transitory media of claim 11 wherein said measuring said similarity scores comprises applying at least one selected from the group consisting of: F1 scoring, balanced accuracy measurement, area under precision recall curve (AUPRC), area under receiver operating characteristic curve (AUROC), precision at n (PAN), mean squared error, normalized discounted cumulative gain (NDCG), mutual information, cross entropy, logistic loss, log loss, and Kullback-Leibler (KL) divergence.

17. The one or more computer-readable non-transitory media of claim 11 wherein each anomaly detector of the plurality of anomaly detectors has a disjoint set of hyperparameters.

18. The one or more non-transitory computer-readable media of claim 11 constrained by at least one selected from the group consisting of:
   a) the instructions does not cause using at least one selected from the group consisting of meta-learning, a metamodel, meta-features, supervised training, and cross validation,
   b) the instructions execute in polynomial time with respect to a count of at least one selected from the group consisting of the plurality of anomaly detectors and the plurality of tuples, and
   c) the instructions execute entirely within a machine learning (ML) pipeline.

19. The one or more computer-readable non-transitory media of claim 11 wherein said calculating said combined similarity scores comprises calculating at least one selected from the group consisting of an average, a median, a maximum, and a sum.

20. The one or more computer-readable non-transitory media of claim 11 wherein the best anomaly detector does not comprise at least one selected from the group consisting of an artificial neural network (ANN) and a contamination factor hyperparameter.

* * * * *

UNITED STATES PATENT AND TRADEMARK OFFICE
CERTIFICATE OF CORRECTION

| | | |
|---|---|---|
| PATENT NO. | : 12,299,553 B2 | Page 1 of 1 |
| APPLICATION NO. | : 18/075824 | |
| DATED | : May 13, 2025 | |
| INVENTOR(S) | : Pushak et al. | |

It is certified that error appears in the above-identified patent and that said Letters Patent is hereby corrected as shown below:

On the Title Page

On page 2, Column 1, item [56] under Other Publications, Lines 27-28, Delete "Intelligenc" and insert -- Intelligence, --, therefor.

On page 2, Column 1, item [56] under Other Publications, Line 31, delete "Artifical" and insert -- Artificial --, therefor.

In the Specification

In Column 3, Line 50, delete "AutoML," and insert -- AutoML --, therefor.

In Column 3, Line 65, delete "metric)," and insert -- metric, --, therefor.

In Column 6, Line 13, delete "DB" and insert -- I1B --, therefor.

In Column 6, Line 16, delete "DA and DB" and insert -- I1A and I1B --, therefor.

In Column 6, Line 34, delete "DA" and insert -- I1A --, therefor.

In Column 15, Line 35, delete "programing" and insert -- programming --, therefor.

In Column 17, Line 18, delete "and or" and insert -- and/or --, therefor.

Signed and Sealed this
Twenty-second Day of July, 2025

Coke Morgan Stewart
*Acting Director of the United States Patent and Trademark Office*